May 2, 1939.  R. H. DUCEY  2,156,806

VEHICLE IDENTIFICATION AND SIGNALING DEVICE

Filed June 25, 1937    2 Sheets-Sheet 1

Inventor
ROGER H. DUCEY
by Everett E. Kent
Attorney

May 2, 1939. R. H. DUCEY 2,156,806
VEHICLE IDENTIFICATION AND SIGNALING DEVICE
Filed June 25, 1937 2 Sheets-Sheet 2
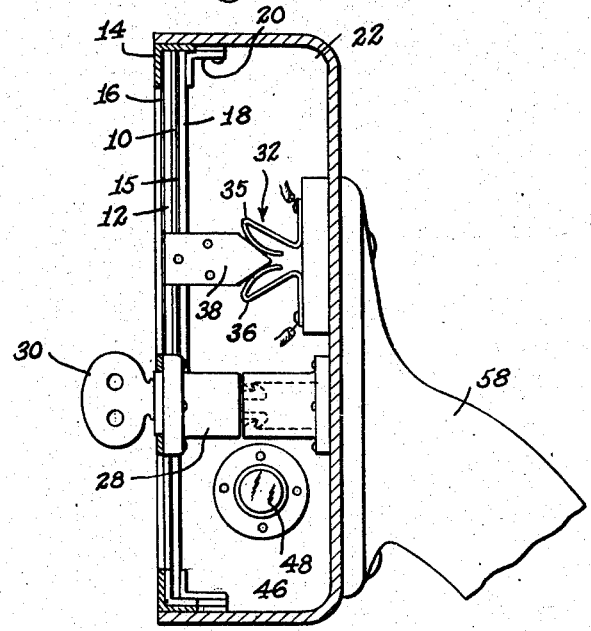
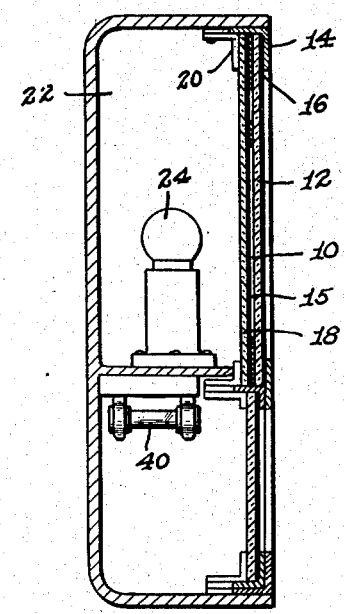
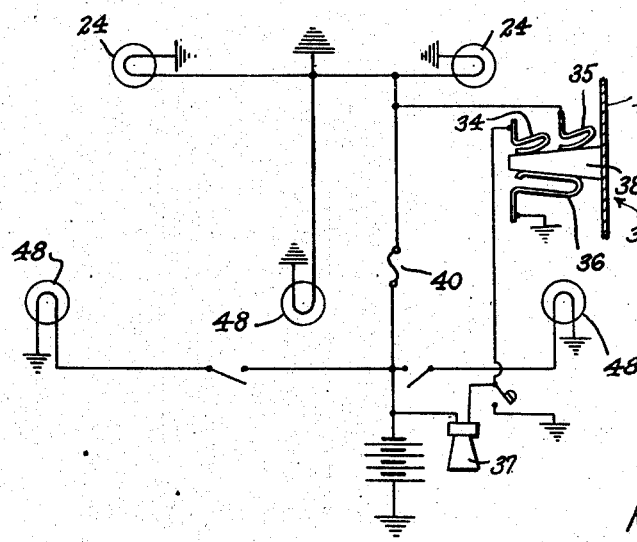
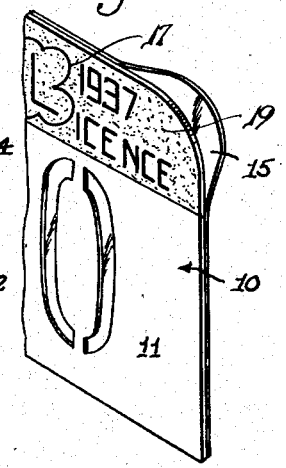
Inventor
ROGER H. DUCEY
by Everett C. Kent
Attorney Patented May 2, 1939

2,156,806

UNITED STATES PATENT OFFICE 2,156,806

VEHICLE IDENTIFICATION AND SIGNALING DEVICE

Roger H. Ducey, Belmont, Mass.

Application June 25, 1937, Serial No. 150,228

1 Claim. (Cl. 40—133)

This invention relates to improvements in vehicle identification and signaling devices.

More especially it provides an improved license number plate for vehicles, which may be combined in a unit having a tail light and other desired signal lights. The invention is applicable to vehicles in a broad sense which includes aircraft and boats as well as automobiles, motorcycles and bicycles, for facilitating identification of vehicles, and for preventing unauthorized removal of a license plate.

License plates as now provided and as now mounted on vehicles may be easily and quickly removed or interchanged by perpetrators of thefts of cars, or by others desirous of eluding the police. Also the present plates, when exposed to the elements, may become difficult to decipher, which is an important defect especially where a hit-and-run driver is speeding away from the scene of an accident.

It is among the objects of the invention to provide a license plate, and means for mounting it, such that the license number will be always clear-cut and readily legible, and such that an attempt to remove the plate will result in an alarm being sounded and/or a short circuiting of the lighting system of the vehicle.

Other objects are to reduce materially the cost of providing license number plates; also to protect the less expensive plates of the invention against becoming soiled or otherwise deteriorating in use.

A further object is to incorporate in the material of the license plate a device for indicating authenticity of the plate.

Still another object is to provide for the illumination of the license plate, to make its number and other data clearly visible at night.

It is, moreover, an important feature that my improved license plate and holder may be combined with a tail light, stop light, and backing light, or with directional signals, in a unit which may be conveniently compact and attractive, and which may be produced at a cost comparable to the cost of the license plate, lights and fixtures as heretofore customarily provided.

For attaining the mentioned objects and results the invention would provide license plates made of opaque paper or other stock and having transparent or translucent numbers, name of state, year, etc. The plate may be protectively held behind glass in a housing, with one or more electric lamps behind the plate, for illuminating the license number, etc. A special distinguishing mark may be embodied in the paper stock of the plate for authentication purposes.

In conjunction with the housing of the license plate, I provide a device which automatically affects the electrical system of the car, whenever an attempt is made to remove the plate. This may be by closing a circuit to the horn, or by blowing a fuse in the lighting system, or both. But, in addition to the automatic safety features, the invention provides so that the license plate may be under lock and key, with the automatic features auxiliary, coming into play only in case access is gained to the plate.

A tail light, stop light and backing light, or arrow signals for indicating direction of turn, may be embodied in the license plate unit, to make a compact and attractive device for the rear of a vehicle. The plate features may be present in the front plate unit, in which case the tail light and signal lights will be omitted.

It is intended that the patent shall cover, by suitable expression in the appended claim, whatever features of patentable novelty exist in the invention disclosed.

In the accompanying drawings:

Figure 3 is an elevation in section on 3—3 of Figure 2;

Figure 4 is an elevation in section on 4—4 of Figure 2;

Figure 5 is a diagram showing the electrical connections; and

Figure 6 is a perspective of a fragment of the improved number plate per se.

Figure 1:
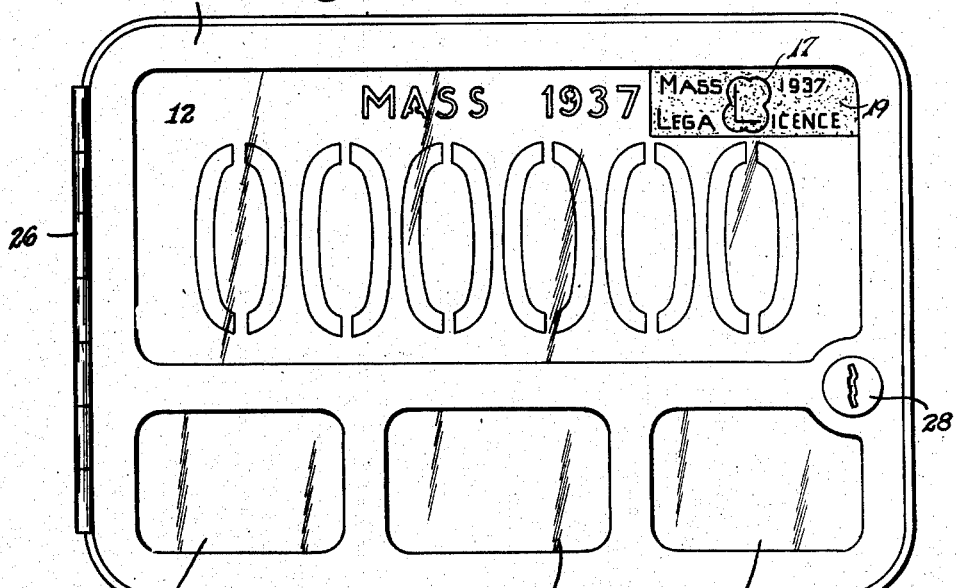
Figure 1 is an elevation of the front face of a license number unit embodying features of the invention.
Figure 2:
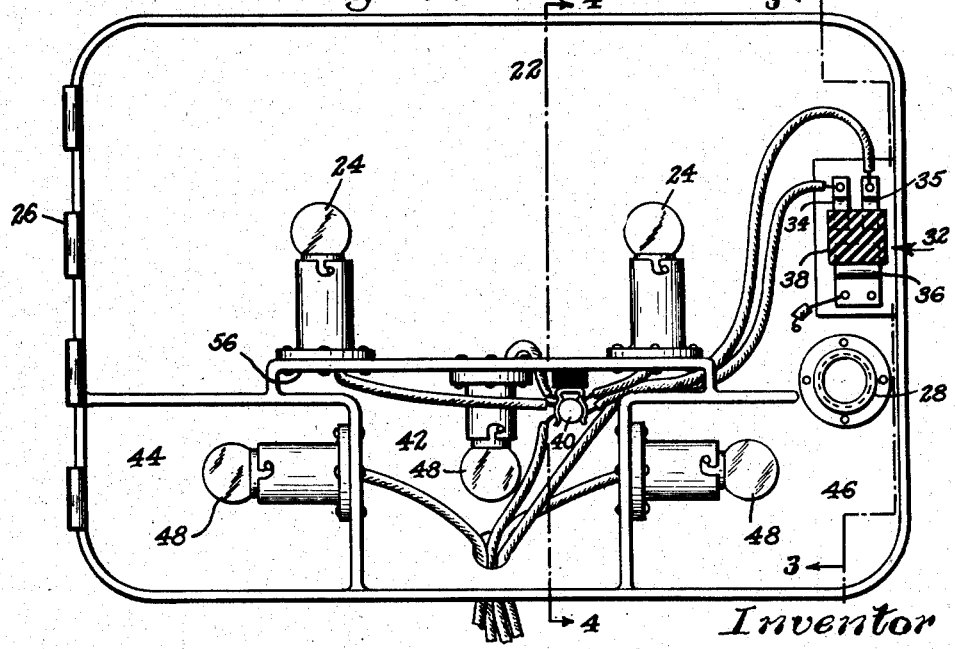
Figure 2 is a similar view with the front of the unit removed.

Referring to the drawings, the license number plate 10, which may be of the regulation size, is mounted behind a glass plate 12 which, if desired, may be of the so-called non-shatterable variety. As represented, the glass plate 12 is secured in a marginal frame 14, being sealed, as by cement 16, against moisture, etc. The license plate 10 is removably mounted in frame 14, behind the glass, and may be backed by a second plate of glass 18 removably held against the license plate by suitable devices 20 which may be swung away or otherwise removed from engagement, in order to remove glass 18 and the license plate 10.

According to the invention, the license plate 10 may safely be of an inexpensive material, such as paper, notwithstanding its perishable character. It is shown as made up of a relatively stiff sheet of paper 11 from the body of which the characters which tell the license number and incidental data are cut out; and a sheet of strong transparent, or in some cases translucent, paper 15 overlies the cut-out portions at the back side of the plate. The stiff paper 11 may be opaque or slightly translucent, and its front face may be enamelled or otherwise treated to give it a desired color. Also, I prefer to embody in it an authenticating device, which may be a special watermark 17, to facilitate detection of spurious plates. If desirable or necessary a portion of the paper 11 may be free from enamel, as suggested at the stippled areas 19 in Figures 1 and 6, to make the authenticating device readily visible.

In the drawings, considering the region 19, and assuming that the sheet 11 is of paper, and the authenticating indication 17 a watermark in that paper, a given illumination passes through the sheet 11 with visual brightnesses which differ at adjoining localities. That is, at such localities as lie within the lines of the watermark, the visual brightness is different from the visual brightness at adjoining localities which are not in any line of the watermark. This may constitute an authenticating indication, representing the identity of the licensor because it is embodied integrally in the paper, is unalterable and is producible only by the maker of the paper at the time when that paper was made. And this is true whether the region 19 about the mark 17 is visually distinct as indicated by the stippling, from the main body of the sheet 11, or whether it is not delineated as a separate region. The representation by symbols of the identity of the license is at a different region, of the same sheet, and is also permanently integral with that sheet. In the drawings it is represented in part, in Figures 1 and 6, by the characters O, which are cut out from the body of the material of the sheet 11. At this region there is also a difference between the ability of adjoining localities in the sheet to pass light, and to resist the passing of light. Light passes through the cut-outs with a brightness which contrasts distinctively with the lack of brightness at the portions of the plate bordering on and defining the cut-outs. Inasmuch as the two differing brightnesses at the region of the watermark are each transmitted through a body of paper; and the brightness at cut-outs has absence of paper, at least one of these differing brightnesses which make the license symbol contrasts distinctively with each of the said brightnesses of the watermark region.

The license plate 10 with its protecting glass constitutes the front wall of a housing 22, within which are mounted the electric lamps 24 which may be connected in the regular lighting system of the vehicle, so that the license plate is illuminated whenever the lighting system of the vehicle is operating.

The housing 22 may be of any suitable material, but I prefer to make it of stiff and strong metal, forming it to the desired shape, by casting, stamping or otherwise.

The marginal frame 14 likewise may be of cast or stamped metal and is portrayed as hinged at 26 at one end of the housing, so that it and its associated license plate and glass swing on the hinge between open and closed positions. The frame 14 is designed to fit snugly within the walls of housing 22 when closed, to minimize the possibility of dust and moisture entering the housing.

A lock 28 is provided for the hinged wall, preventing all persons from getting access to the interior of the housing and to the license plate except by means of a key 30 which may if desired be the ignition switch key of the vehicle.

The invention, however, provides additional safeguards against removal and interchange of license plates. A switch 32 is mounted within housing 22, comprising the spring contacts 34, 36 which tend normally to contact together to close a circuit to the horn 37 of the vehicle. When the hinged door of the unit is closed, an element 38 of insulating material holds contacts 34, 36 spread apart. But as soon as the door is opened, they spring together and the horn sounds an alarm. If desired, a fuse 40 may be introduced into the lighting system, with connection to contacts 35, 36, so that any closing of the contacts will blow the fuse and put out of operation all or any desired part of the lighting system of the vehicle.

The described automatic safety features have utility only in connection with unauthorized tampering with a license plate unit. An authorized opening of the unit, such as for changing the license plate at the commencement of a new year, should be preceded by disconnection of a battery terminal. In the case of dealers, who change license plates frequently from day to day, the automatic safety features may be disconnected, and reliance for protection against theft of plates be placed entirely on the lock 28.

As illustrated in the drawings, the license plate features are combined in a unit with a tail light, stop light and backing light. These are arranged below the license plate, for which purpose housing 22 is larger than the plate. Interiorly, the housing has partitions dividing the lower portion of housing into three chambers, each having an electric lamp 48 therein, of which the chamber 42 having red glass 50 may serve for the tail light, 44 having white glass 52 for the backing light and 46 having amber glass 54 for the stop light. These lights will be connected to the lighting system in the customary or any suitable way, for example, the tail light so as to be on whenever the headlights are on; stop light to be operated by the brake pedal; and the backing light to be lighted when the gear shift lever is moved into reverse position. The frame 14 may have provision for mounting the glass 50, 52 and 54, so that opening of the front of the unit gives access to the various lamps.

The tail light chamber 42 may open into the number plate chamber, as illustrated, and its lamp 48 may be mounted on the under side of a support 56 which may carry, on its upper side, the lamps 24.

Any desired type of mounting bracket 58 may be provided on the back wall of the unit, and the conductor wires may enter the unit thru this bracket, or a separate flexible cable may house the conductors, preferably at the back of the unit.

I claim as my invention:

A license plate made of paper which is made opaque by means of paint or otherwise, there being license numbers cut through said plate, the means which renders the plate opaque being omitted from another region of the plate, and a mark being there, integrally embodied in the structure of the paper, visible by translucence, and constituting an authenticating mark.

ROGER H. DUCEY.